United States Patent
Centlivre et al.

(10) Patent No.: US 7,217,222 B2
(45) Date of Patent: May 15, 2007

(54) METHOD AND SYSTEM FOR INFERRING AND CONTROLLING TRANSMISSION FLUID TEMPERATURE

(75) Inventors: James Centlivre, Grosse Ill, MI (US); David Orton, Westland, MI (US); Brad Riedle, Northville, MI (US); Barbara Hartline, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 260 days.

(21) Appl. No.: 10/907,545

(22) Filed: Apr. 5, 2005

(65) Prior Publication Data
US 2006/0223673 A1 Oct. 5, 2006

(51) Int. Cl.
*F16H 59/72* (2006.01)

(52) U.S. Cl. .......................................... 477/98; 701/51
(58) Field of Classification Search .................. 477/98, 477/168, 169, 181; 701/36, 51; 192/3.28–3.3, 192/84 T
See application file for complete search history.

(56) References Cited

U.S. PATENT DOCUMENTS

| | | |
|---|---|---|
| 4,509,124 A | 4/1985 | Suzuki et al. |
| 4,815,340 A * | 3/1989 | Iwatsuki et al. ............... 477/98 |
| 5,050,717 A | 9/1991 | Shibayama |
| 5,319,963 A * | 6/1994 | Benford ...................... 73/118.1 |
| 5,347,885 A | 9/1994 | Taga et al. |
| 5,601,511 A | 2/1997 | Michioka |
| 5,707,315 A * | 1/1998 | Furukawa et al. ............ 477/98 |
| 5,722,519 A | 3/1998 | Kirchhoffer et al. |
| 5,857,162 A | 1/1999 | Vukovich et al. |
| 5,995,887 A * | 11/1999 | Hathaway et al. ............ 701/34 |
| 6,341,679 B1 | 1/2002 | Abe et al. |
| 6,549,838 B2 | 4/2003 | O'Neil et al. |
| 6,632,157 B1 | 10/2003 | Gierling et al. |
| 6,682,458 B2 | 1/2004 | Gabriel et al. |
| 6,959,239 B2 * | 10/2005 | Williams et al. .............. 701/55 |
| 2006/0183596 A1* | 8/2006 | Etchason et al. ............. 477/98 |

FOREIGN PATENT DOCUMENTS

| | | |
|---|---|---|
| JP | 05-196123 A | 8/1993 |
| JP | 410169483 A | 6/1998 |

* cited by examiner

*Primary Examiner*—Charles A Marmor
*Assistant Examiner*—Justin K. Holmes
(74) *Attorney, Agent, or Firm*—David B. Kelley; Brooks Kushman P.C.

(57) ABSTRACT

A method is disclosed for limiting coolant temperature at a coolant flow exit port for a hydrokinetic torque converter in a powertrain for a vehicle having an engine and a power transmission mechanism, wherein the transmission and the torque converter are disposed in a common coolant flow circuit whereby a coolant flow line from the torque converter to a cooler is protected from failure due to excessive coolant temperature.

7 Claims, 4 Drawing Sheets

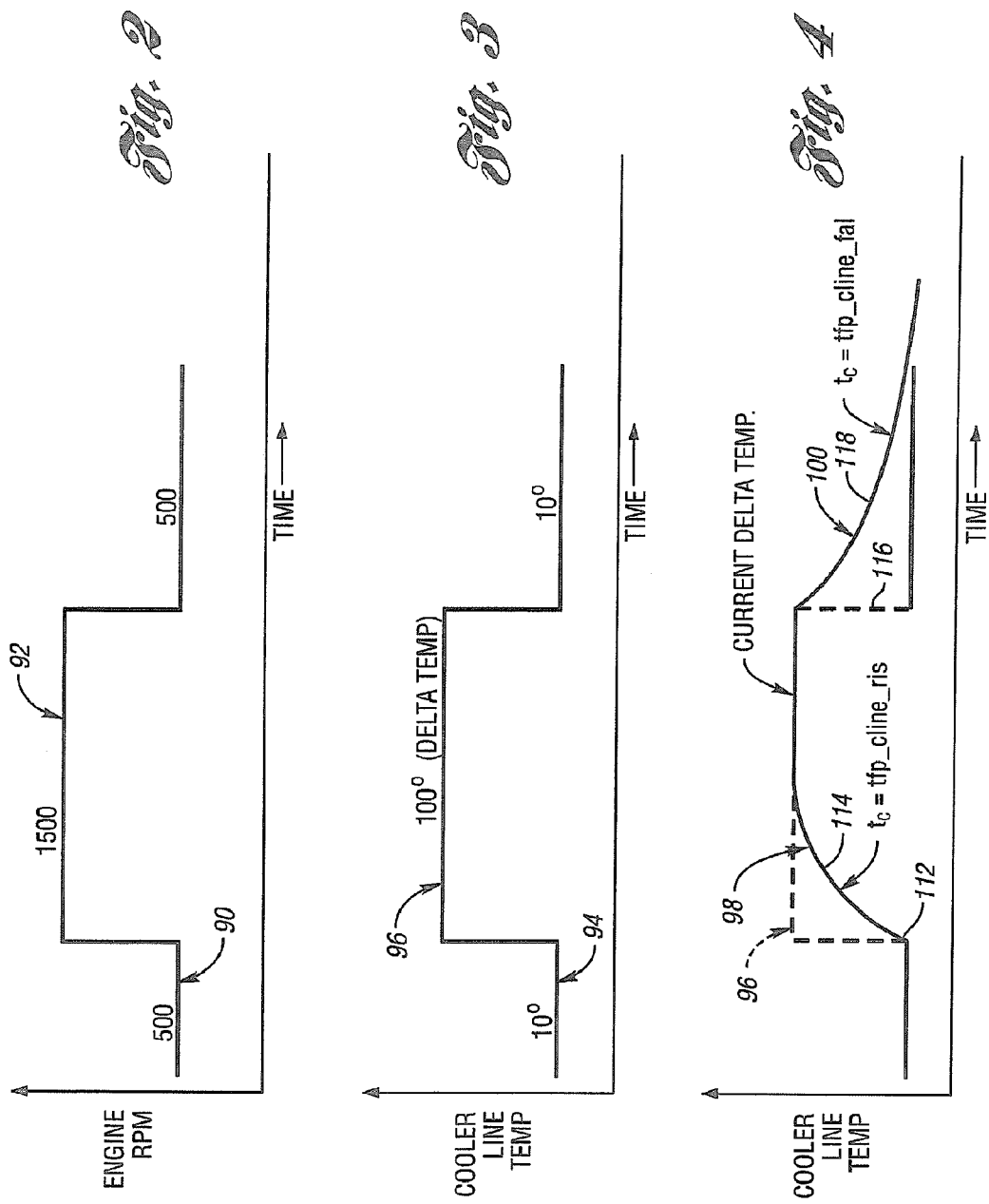

METHOD AND SYSTEM FOR INFERRING AND CONTROLLING TRANSMISSION FLUID TEMPERATURE

BACKGROUND OF THE INVENTION

1. Field of the Invention

The invention comprises a method for inferring transmission fluid temperature in an automatic transmission with a hydrokinetic torque converter, particularly the temperature of the transmission fluid at the flow inlet side of a transmission oil cooler.

2. Background Art

A power transmission mechanism commonly used in powertrains for automotive vehicles typically includes an internal combustion engine and a multiple ratio geared transmission with an input shaft connected to an engine crankshaft and an output shaft drivably connected to vehicle traction wheels through a differential and axle mechanism. Typically, the automatic transmission comprises a hydrokinetic torque converter, usually a three-element torque converter, located between the crankshaft of the engine and torque input gearing for the transmission.

A transmission fluid sump, sometimes referred to as an oil sump, is defined by a transmission case that envelops torque-transmitting gearing. A transmission fluid pump is drivably connected to a torque input shaft for the transmission. The pump has a fluid input port that is in fluid communication with the fluid sump. For purposes of lubrication and cooling, the pump establishes flow throughout the transmission and to the torque converter elements, including an engine-driven impeller, a turbine connected drivably to transmission gearing, and a stator located between the hydrokinetic torque converter fluid flow inlet for the impeller and the hydrokinetic fluid flow exit for the turbine. The fluid circulating through the elements of the torque converter is common to the fluid in the fluid sump for the transmission.

A transmission fluid flow outlet port (case-out port) in the torque converter communicates with a fluid cooler, typically an air-to-liquid cooler. Fluid then is returned from the cooler through a cooler return flow circuit to the torque converter and the transmission. The fluid ultimately is received by the transmission oil sump and then recirculated by the transmission pump. It is known design practice to provide a transmission fluid temperature sensor in the transmission sump for measuring fluid temperature in the sump.

As the transmission fluid circulates from the sump through the torque converter, a substantial temperature rise will occur in the toroidal flow circuit of the torque converter before the fluid is distributed from the torque converter fluid outlet to the cooler. There can be a substantial temperature difference, therefore, between the measured temperature at the transmission fluid sump and the actual fluid temperature at the fluid flow outlet port of the torque converter. The temperature rise in the transmission fluid within the torque converter can be substantial when the torque converter operates at low speed ratios as mechanical energy from the engine-driven impeller is transformed into thermal energy.

At high speed ratios for the torque converter, the transformation of kinetic energy developed by the torque converter to thermal energy is reduced. At a precalibrated engine speed for any given engine torque, a torque converter lock-up clutch will be engaged, thereby substantially eliminating a thermal energy build-up in the torque converter as fluid circulates from the fluid sump to the cooler.

It is known design practice to use a metallic transmission fluid line connecting the torque converter flow outlet port to the cooler. In installations that do not accommodate a metallic coolant flow line from the torque converter to the cooler, attempts have been made to use plastic cooler lines. A plastic material known in the automotive industry that can be used for this purpose is known as PA-12 plastic, which is a semi-flexible thermoplastic polymer. Under certain operating conditions, the fluid temperature can be high enough (e.g., about 300° F.) to cause the plastic cooler line upstream of the cooler to fail.

Typically, fluid temperatures may increase during operation of the powertrain in a stalled mode with the brakes applied at zero vehicle speeds, or when the vehicle is towing a trailer at low vehicle speed with the torque converter clutch in an open state, or during sustained high vehicle speed operation with the converter clutch in an open state. A converter clutch open state may be encountered when the converter lock-up clutch controls malfunction, whereby the converter clutch will not respond to a command by a vehicle powertrain controller to engage at a calibrated vehicle speed for a given engine throttle setting. Steps can be taken to mitigate the undesirable effects of a high temperature build-up of temperature in the oil cooler lines by truncating engine torque until the transmission fluid temperature falls below a desired temperature threshold.

SUMMARY OF THE INVENTION

The temperature of the coolant fluid in the transmission fluid sump is measured by a transmission oil temperature sensor. That temperature, of necessity, is lower than the transmission fluid temperature at the torque converter coolant outlet flow port. The invention comprises a method and control strategy for protecting the plastic cooler lines against the effect of excessive temperature. It takes into account the effect of thermal energy created by the hydrokinetic torque converter and the temperature increase resulting from that additional thermal energy.

The method of the invention infers a fluid temperature at the outlet port of the torque converter and executes a control strategy that prevents cooler line damage due to high fluid temperatures in the cooler line. Excessive high temperatures could be caused, for example, by a brake stall mode with vehicle speed equal to zero, or by a trailer-towing mode at low vehicle speed when the torque converter clutch fails in an open clutch state, or by operating the vehicle for a sustained period at a high vehicle speed when the converter clutch has failed in an open clutch state. Under these conditions, the control strategy of the invention uses the inferred torque converter outlet port temperature in executing a torque truncation strategy for the engine if the inferred temperature reaches a threshold value. The torque truncation then can be terminated after the transmission fluid temperature falls below a temperature threshold.

The inferred temperature (case-out temperature) is obtained by measuring the transmission fluid sump temperature and determining a delta steady-state temperature for the coolant fluid at a flow exit port for the torque converter. The delta steady-state temperature is lower than a predetermined temperature at which the coolant flow line material will fail.

The control strategy includes the method step of computing torque converter speed ratio for each control loop of an electronic control processor. The speed ratio value is used in a calculation of inferred coolant temperature at the torque converter outlet flow port.

An engine torque limiting strategy is initiated if the inferred temperature exceeds a predetermined level. That strategy may involve engine spark timing retardation in the case of a powertrain with a spark-ignition internal combustion engine. It may involve de-fueling the engine cylinders in the case of both diesel engines and spark-ignition engines.

BRIEF DESCRIPTION OF THE DRAWINGS

FIG. 2 is a time plot of engine speed during a typical operating condition in which the engine operates during a brake stall, zero vehicle speed mode or during a period when the torque converter clutch has failed in an open state;

FIG. 3 is a time plot of typical cooler line temperatures that might occur during operation of the engine under the special operating conditions indicated in FIG. 2;

FIG. 4 is a time plot of the cooler line temperature that is inferred using the control strategy of the invention.

DETAILED DESCRIPTION OF THE PREFERRED EMBODIMENTS

Figure 1:
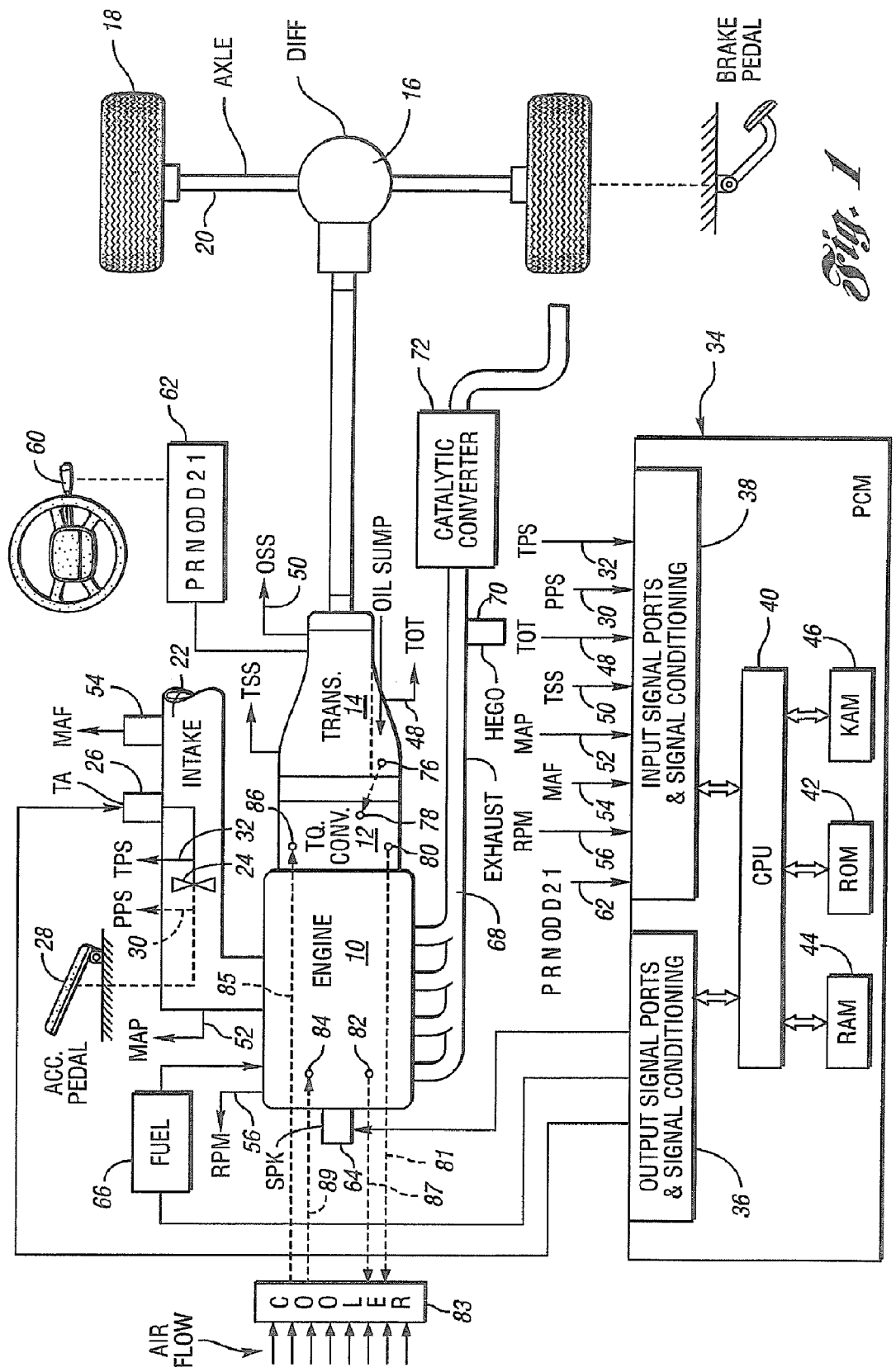
FIG. 1 is a schematic diagram of a powertrain system showing an engine, a torque converter and a transmission for an automotive vehicle, together with control components of a vehicle system control, wherein temperature rise in transmission fluid is controlled, as transmission fluid is circulated from a transmission sump and through a hydrokinetic torque converter to a transmission fluid cooler circuit.

In FIG. 1, an automotive vehicle engine is schematically shown at 10. It develops an engine torque that is distributed to a hydrokinetic torque converter 12. The torque converter has an impeller, not shown, connected to the crankshaft of the engine and a turbine, not shown, connected to torque input gearing of a transmission 14. The torque output elements of the gearing distribute driving torque to a geared differential 16 through a driveshaft. The torque output elements of the differential distribute torque to the traction wheels 18 through axle shafts 20.

The engine has an air intake manifold system schematically shown at 22, which admits air to engine air intake valve ports, the flow through the intake manifold being controlled by a throttle valve 24 and actuator 26. The driver demand for engine torque is developed by an accelerator pedal 28. A pedal position sensor at 30 provides an indication of the pedal position as the throttle actuator establishes a throttle position that is sensed by throttle position sensor at 32.

A powertrain control module (microprocessor-PCM), generally shown at 34, is used to control both the engine and the transmission. It may be a conventional digital processor characterized by repetitive control loops. It includes output signal ports and signal conditioning circuits 36 and input signal ports and signal conditioning circuits 38. The data received by the input signal ports is acted upon by a central processor unit 40. Control algorithms used by the CPU 40 are stored in main read-only memory portion 42. The data received from sensors in the powertrain are stored by random access memory 44. A keep-alive memory 46 retains computed functions using data supplied by the various sensors when the powertrain is deactivated.

The signal developed by the throttle position sensor 32 is distributed to the input signal ports 38. A pedal position sensor, a turbine oil temperature sensor, a turbine speed sensor, a manifold pressure sensor, a mass air flow sensor and an engine speed sensor are shown, respectively, at 30, 48, 50, 52, 54 and 56.

A driver-controlled range selector mechanism for the transmission 14 is schematically shown at 60. It typically is located on the vehicle steering wheel column, but it may be located also in the vehicle control console within the vehicle passenger compartment. The range selector activates a range sensor 62, which distributes a signal to the input signal ports 38. The values for the sensor readings for each control loop are stored in RAM 44. The CPU 40 retrieves the sensor information and uses it in executing algorithms stored in ROM 42.

The powertrain control module can control engine torque by modifying the engine spark advance or by controlling the fuel injection rate or by using an engine cut-out technique. A spark retard signal can be distributed from the output signal ports 36 to a spark retard control 64 to effect torque truncation. A fuel controller 66 may receive an engine torque truncation signal from the output signal ports 36.

The engine 10 has an exhaust manifold system shown generally at 68. The heated exhaust gas oxygen sensor 70 typically would be included in the exhaust system, as well as a catalytic converter 72 for oxidizing in known fashion undesirable exhaust gas emissions.

The transmission fluid sump, indicated in FIG. 1 as an oil sump, is identified by reference numeral 76. Fluid circulates through the torque-transmitting gearing of the transmission and to the torque converter, as indicated at 78. The fluid outlet flow port for the torque converter is indicated at 80. It communicates with a cooler line leading to a fluid cooler 83, the line being schematically illustrated at 81. The fluid, after circulating through the cooler, is returned to the return port 86 of the torque converter through a cooler return flow line, as indicated schematically at 85. Engine lubricating oil is distributed to cooler 83 through cooler line 87 and is returned to the engine through cooler line 89.

FIG. 2 is a time plot of engine speed when the powertrain is operating under special conditions, such as a brake stall or operation with the torque converter clutch failed open. The engine speed is increased from a value of 500 rpm, for example, as shown at 100, to a value of 1500 rpm, as shown at 102. At the end of the special operating condition, the engine speed is returned to a low value such as the original value of 500 rpm, as shown at 104.

FIG. 3 is a time plot of the temperature variation that occurs during the engine speed changes illustrated in FIG. 2. As an example, the cooler line temperature leading from the torque converter to the cooler may be 10° Centigrade, as shown at 94, before the start of the special operating condition. The processor, as will be explained subsequently, will compute a so-called delta temperature of 100° Centigrade, as shown at 96. After the special operating condition no longer exists, the cooler line temperature will be commanded by the PCM 34 to return to a low value such as the original value of 10° Centigrade, as shown.

The delta temperature, as shown in FIG. 3, is a steady-state temperature that remains relatively unchanged during the duration of the special operating condition indicated in FIG. 2. The value of the delta temperature is determined during calibration to meet the physical characteristics of the plastic material of which the cooler line is formed. Preferably, the cooler line is made of PA-12 plastic, which tends to fail when the fluid temperature in the cooler line reaches approximately 350° F.

FIG. 4 shows the inferred cooler line temperature at 98 throughout the special operating condition indicated in FIG. 2. FIG. 4 is a time plot of the inferred delta temperature superimposed on the delta temperature information indicated in FIG. 3. When a delta temperature value is commanded at 112, a cooling line temperature is computed using a time constant $t_c$=tfp_cline_ris. The temperature curve is generally parabolic in shape, as shown at 114 during the temperature rise from 10° Centigrade to the current delta temperature. As previously indicated, the current delta temperature is a steady-state temperature at a value below the temperature at which the cooler line plastic will fail. After the special operating condition ends and the temperature is commanded to fall at 116, the temperature will decrease, as shown at 118. The rate of decrease is less than the rate of increase at 114. The slower rate during a decrease is due to the use of a different time constant, which is equal to tfp_cline_fal.

The time constant used in computing the inferred cooling line temperature is the time constant of a first order ROLAV filter.

The delta temperature is the temperature at the flow outlet port of the torque converter minus the measured oil sump temperature at 48 in FIG. 1. The value of the inferred cooling line temperature at any point of the plot of FIG. 4 is expressed by the following equations:

$$y(k) = y(k-1) + \left(\frac{1}{1+\left(\frac{T_c}{T_s}\right)}\right) \times (x(k) - y(k-1)) \quad (A)$$

where $T_c$=a time constant (A1)

$T_s$=sample period (A2)

$x(k)$=filter input at time $k \cdot T_s$ (A3)

$y(k)$=filter output at time $k \cdot T_s$ (A4)

$y(k-1)$=filter output at time $(k-1) \cdot T_s$ (A5)

In the foregoing expressions, the symbol "k" represents the current control loop of the microprocessor 34. The term "y(k−1)" represents the inferred cooler line temperature during the preceding control loop of the processor 34.

Figure 5:
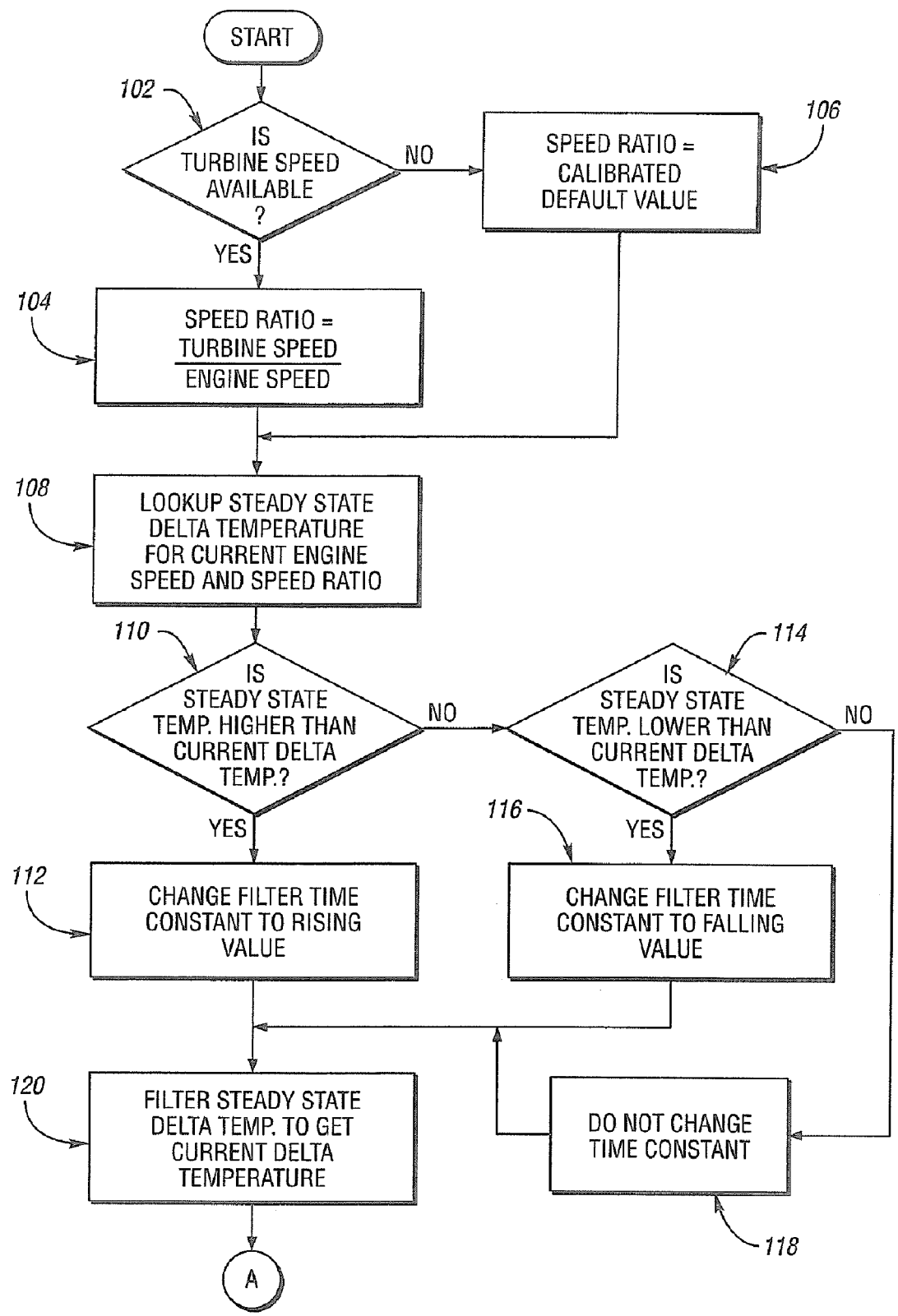
FIGS. 5 and 6 show a flow chart demonstrating the control strategy for obtaining an inferred cooler line temperature at the flow outlet port for the torque converter illustrated in FIG. 1.
Figure 6:
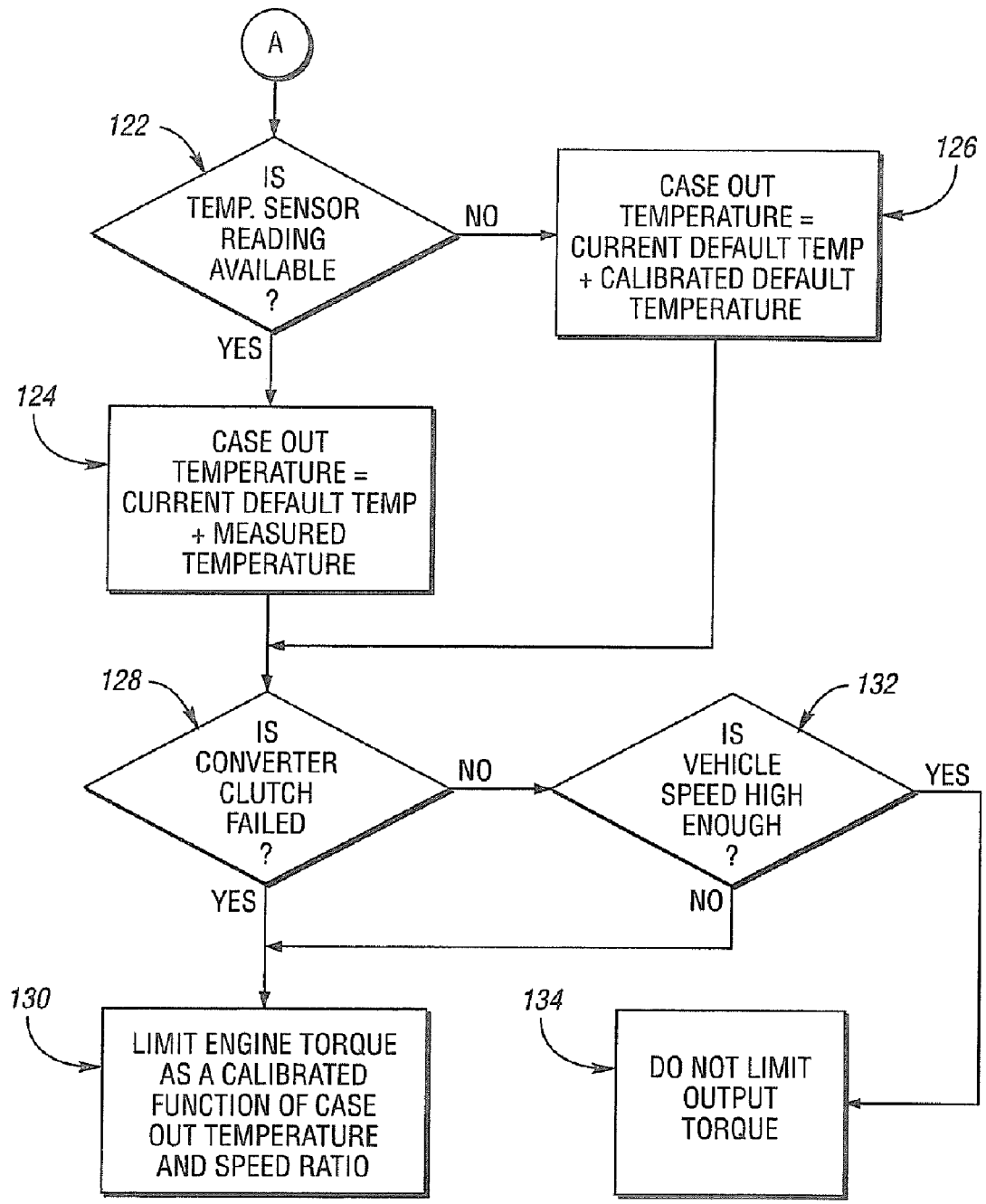

FIGS. 5 and 6 illustrate the control strategy for computing an inferred cooler line case-out temperature using the strategy of the invention. The control routine begins at decision block 102 where it is determined whether the turbine speed sensor 50 has failed. The turbine speed sensor, of course, also is an indicator of vehicle speed or output shaft speed. Thus, an output shaft speed or a vehicle speed sensor could be used for purposes of this control routine.

If the turbine speed sensor has not failed and a turbine speed is available, the routine will determine the speed ratio at action block 104. This is done by dividing turbine speed by engine speed. If turbine speed is not available (for example, if the turbine speed sensor has failed), a speed ratio will be computed at 106. A calibrated default value for a speed ratio will be selected from a table in the processor memory (ROM). The precalibrated default value should be a conservative value such as zero or stall.

The routine then proceeds to action block 108, where a calibrated value for a steady-state delta temperature is obtained from a look-up table. The delta temperature is shown at 102 in FIG. 2. The routine then proceeds to decision block 110, where it is determined whether the steady-state temperature determined at 108 is higher than the current delta temperature computed at 114, as shown in FIG. 4. If the steady-state temperature is higher than the current delta temperature, a value for cooler line temperature using a rising filter time constant is computed. The rising filter time constant is shown in FIG. 4.

If the steady-state temperature obtained from the look-up table at 108 is lower than the current delta temperature, a different time constant will be used in the calculation of cooling line temperature. This is indicated as a falling time constant in FIG. 4. If the steady-state temperature is not lower than the current delta temperature determined at 114, the routine then will not cause a change in the time constant as indicated at 118. If the steady-state temperature determined at 114 is lower than the current delta temperature, the routine will change the filter time constant to the falling time constant value.

Following the action taken at either action block 112 or 116, the routine will proceed to action block 120, where the filtered steady-state delta temperature is calculated using the filtered time constant determined at 116 or 112 to produce a current delta temperature for the current control loop. The processor will develop a filtered steady-stated value for each control loop.

The routine then proceeds to decision block 122, where it is determined whether the transmission fluid temperature sensor 48 has failed. If a transmission fluid temperature is available, the routine will proceed to action block 124. If the transmission fluid temperature reading is available, the torque converter case-out temperature will be computed by adding the current delta temperature to the measured temperature. If a transmission temperature sensor reading is not available, a torque converter case-out temperature value is determined at action block 126 by adding a calibrated default temperature value, which is a scaler calculated value, to the delta temperature determined in the current control loop of the PCM 34.

The routine then proceeds to decision block 128, where it is determined whether the torque converter lock-up clutch has failed. If the lock-up clutch has failed, the routine will proceed to action block 130, where the engine torque is limited to a calibrated function of torque converter outlet temperature and speed ratio. If the torque converter clutch has not failed, however, it is determined at decision block 132 whether the vehicle speed is high enough so that the special operating conditions, as previously discussed, would not be in effect. Thus, if the vehicle operating condition is not a brake stall mode, or if the converter lock-up clutch has not failed, the engine torque is not limited, as indicated at 134. Thus, for example, if the vehicle is pulling a trailer at high speeds, the engine torque will not be truncated.

Although an embodiment of the invention has been disclosed, it will be apparent to persons skilled in the art that modifications may be made without departing from the scope of the invention. All such modifications and improvements thereof are intended to be covered by the following claims.

What is claimed is:

1. A method for controlling transmission fluid temperature in a vehicle powertrain that comprises an engine, a power transmission and a hydrokinetic torque converter with an engine-driven impeller and a turbine, the torque converter and the transmission forming power flow paths from the engine-driven impeller to vehicle traction wheels, a transmission fluid cooler in a cooling fluid flow circuit that includes the transmission, the torque converter, the cooler and coolant flow lines between the torque converter and the cooler, and an electronic control processor with repetitive control loops, the method comprising the steps of:

measuring transmission fluid temperature;
determining a delta steady-state temperature for the coolant at a coolant flow exit port for the torque converter that is not greater than a predetermined temperature;
computing speed ratio for the torque converter;
computing in successive processor control loops an inferred coolant temperature at the coolant flow exit port based on computed inferred coolant temperature in a preceding processor control loop; and
limiting engine torque as a calibrated function of current inferred temperature and speed ratio, whereby temperature at the coolant flow exit port for the torque converter is maintained at a temperature level that is not greater than a predetermined value.

2. The method set forth in claim 1, wherein the inferred temperature of the coolant at the coolant flow exit port for the torque converter is the same as the measured transmission fluid temperature and a current delta steady-state temperature.

3. The method set forth in claim 1 including the step of determining whether a measured turbine speed is available; and
using a calibrated default value for computing speed ratio when turbine speed is not available.

4. The method set forth in claim 2 including the step of determining whether a measured turbine speed is available; and
using a calibrated default value for computing speed ratio when turbine speed is not available.

5. A method for controlling transmission fluid temperature in a vehicle powertrain that comprises an engine, a power transmission and a hydrokinetic torque converter with an engine-driven impeller and a turbine, a torque converter lock-up clutch for connecting the turbine and the impeller at high speed ratios, the torque converter and the transmission forming power flow paths from the engine-driven impeller to vehicle traction wheels, a transmission fluid cooler in a cooling fluid flow circuit that includes the transmission, the torque converter, the cooler and coolant flow lines between the torque converter and the cooler, and an electronic control processor with repetitive control loops, the method comprising the steps of:
measuring transmission fluid temperature;
determining a delta steady-state temperature for the coolant at a coolant flow exit port for the torque converter that is not greater than a predetermined temperature;
computing speed ratio for the torque converter;
computing in successive processor control loops an inferred coolant temperature at the coolant flow exit port based on computed inferred coolant temperature in a preceding processor control loop;
determining whether the lock-up clutch is failed; and
limiting engine torque as a calibrated function of current inferred temperature and speed ratio when the lock-up clutch is failed, whereby temperature at the coolant flow exit port for the torque converter is maintained at a temperature level that is not greater than a predetermined value.

6. The method set forth in claim 5, wherein the inferred temperature of the coolant at the coolant flow exit port for the torque converter is the same as the measured transmission fluid temperature and a current delta steady-state temperature.

7. The method set forth in claim 5 including the step of determining whether a measured turbine speed is available; and
using a calibrated default value for computing speed ratio when turbine speed is not available.

* * * * *